(12) United States Patent
Hoover et al.

(10) Patent No.: US 10,185,856 B1
(45) Date of Patent: Jan. 22, 2019

(54) METHOD AND SYSTEMS FOR RENDERING OF VIRTUAL DISPLAYS USING CRYPTOGRAPHIC SYMBOLS

(71) Applicant: Capital One Services, LLC, McLean, VA (US)

(72) Inventors: Jason Hoover, Grapevine, TX (US); Stephen Wylie, Carrollton, TX (US); Sunil Vasisht, Flowermound, TX (US); Geoffrey Dagley, McKinney, TX (US); Micah Price, Plano, TX (US); Qiaochu Tang, The Colony, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 4 days.

(21) Appl. No.: 15/915,448

(22) Filed: Mar. 8, 2018

(51) Int. Cl.
  *G06K 7/12* (2006.01)
  *G06K 7/14* (2006.01)
(52) U.S. Cl.
  CPC ............. *G06K 7/12* (2013.01); *G06K 7/1413* (2013.01); *G06K 7/1417* (2013.01)
(58) Field of Classification Search
  None
  See application file for complete search history.

(56) References Cited

U.S. PATENT DOCUMENTS

| 5,938,727 A * | 8/1999 | Ikeda ................ G06F 17/30879 707/E17.113 |
| 2014/0339296 A1* | 11/2014 | McAdams ........ G06F 17/30879 235/375 |

\* cited by examiner

*Primary Examiner* — Kristy A Haupt
(74) *Attorney, Agent, or Firm* — Finnegan, Henderson, Farabow, Garrett & Dunner LLP

(57) ABSTRACT

Methods and systems for rendering virtual displays using cryptographic symbols are disclosed. In one aspect, a display device is disclosed that includes a processor and data storage including instructions that, when executed by the processor, cause the system to perform operations. The operations include emitting infrared light toward a cryptographic symbol associated with a surface, receiving a reflection of the emitted natural or man-made sunlight from the cryptographic symbol, and, based on the reflection, decrypting the cryptographic symbol to determine a unique identifier. The operations further include, based on the identifier, generating a first virtual display, and rendering the first virtual display on an image of the surface, through a heads up display, or projected onto the surface.

20 Claims, 12 Drawing Sheets

METHOD AND SYSTEMS FOR RENDERING OF VIRTUAL DISPLAYS USING CRYPTOGRAPHIC SYMBOLS

BACKGROUND

In some cases, it may be desirable to display information on a surface of an object. For example, a museum may seek to display information about an artwork on a plaque, or a realtor may wish to display information about a home in a window.

When such information is displayed, however, the information may obscure a view of the product. For example, information about a product displayed by a grocery store on a door to a freezer case may obscure a view of the product. Such display of information about a product may also obscure other views. For example, information displayed on an automobile windshield may obscure a view of a driver test driving an automobile. Moreover, the physical nature of surfaces may limit the amount of information that can be displayed, and once displayed, the information may be difficult to change or update. It is therefore desirable to provide improved systems and methods which address these issues.

SUMMARY

The disclosed embodiments describe methods and systems for rendering of virtual displays using cryptographic symbols.

In one aspect, a device is disclosed that includes a processor and data storage including instructions that, when executed by the processor, cause the system to perform operations. The operations include emitting infrared light toward a cryptographic symbol associated with a surface; receiving a reflection of the emitted infrared light from the cryptographic symbol; based on the reflection, decrypting the cryptographic symbol to determine a unique identifier; based on the identifier, generating a first virtual display; and rendering the first virtual display on an image of the surface.

In another aspect, a device is disclosed that includes a processor and data storage including instructions that, when executed by the processor, cause the system to perform operations. The operations include receiving a reflection of infrared sun light from the cryptographic symbol; based on the reflection, decrypting the cryptographic symbol to determine a unique identifier; based on the identifier, generating a first virtual display; and rendering the first virtual display on an image of the surface.

In another aspect, a system is disclosed that includes a processor and data storage including instructions that, when executed by the processor, cause the system to perform operations. The operations include detecting a cryptographic symbol associated with a surface of an object using light of wavelengths outside of the visible spectrum; determining an orientation of the surface relative to the device; decrypting the cryptographic symbol to determine an identifier that uniquely identifies the object; based on the identifier, generating a first virtual display; and based on the determined orientation, rendering the first virtual display on an image of the surface or rendering the first virtual display on a heads up display. Alternatively, the first virtual display may be projected onto a surface.

Aspects of the disclosed embodiments may include non-transitory, tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. The disclosed systems, methods, and media relate to rendering of virtual displays using cryptographic symbols.

Figure 1:
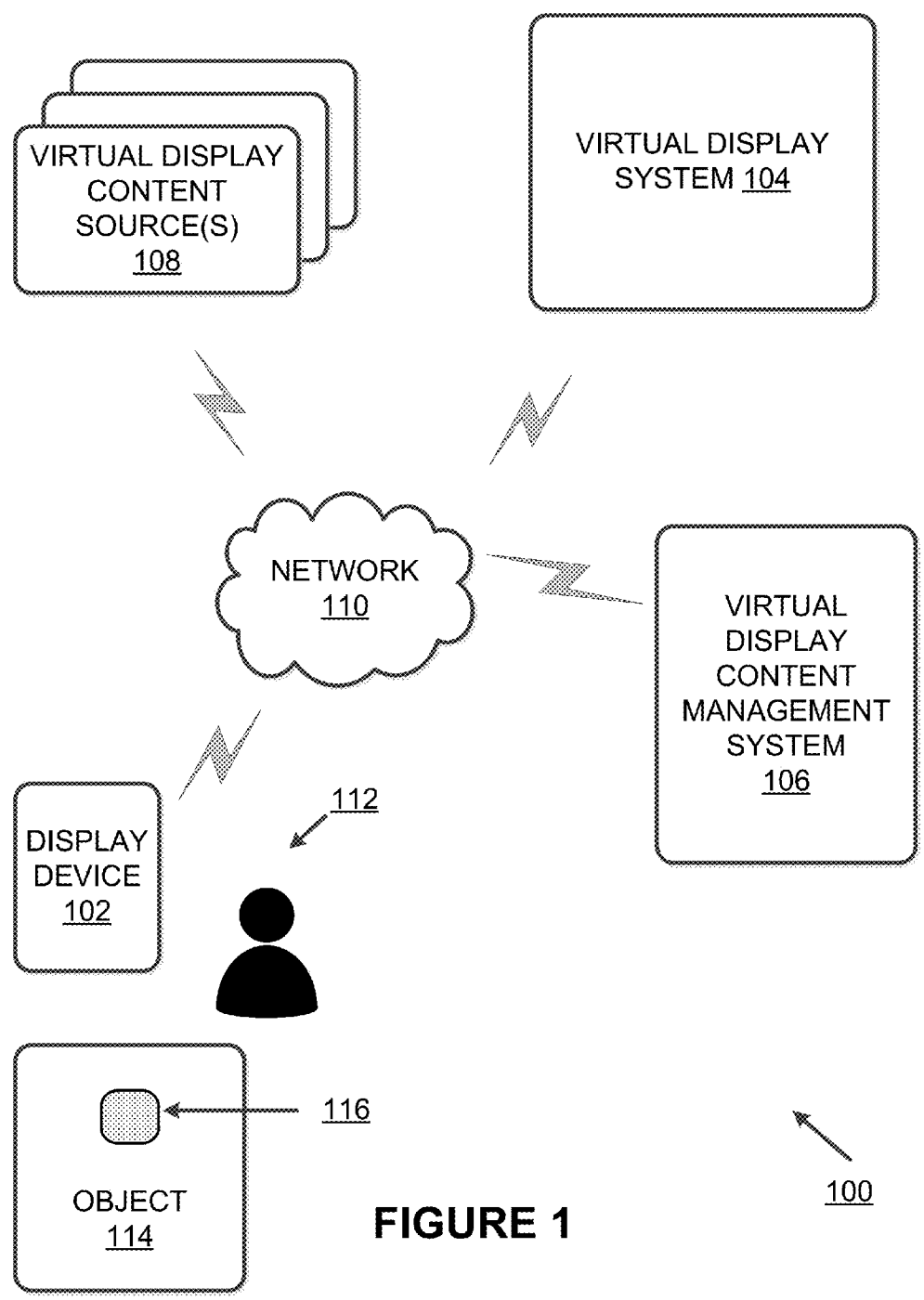
FIG. 1 is a block diagram of an exemplary system, consistent with disclosed embodiments.

FIG. 1 is a block diagram of an exemplary system 100, consistent with disclosed embodiments that may be configured for performing a virtual display rendering process consistent with disclosed embodiments. As shown, system 100 may include a display device 102, a virtual display system 104, a virtual display content management system 106, and one or more virtual display content source(s) 108, all of which may be communicatively coupled by a network 110. While only one display device 102, virtual display system 104, and virtual display content management system 106 are shown, it will be understood that system 100 may include more than one display device 102, virtual display system 104, and/or and virtual display content management system 106 as well. Further, while certain numbers of virtual display content source(s) 108 are shown, it will be understood that system 100 may include more or fewer virtual display content management systems as well. More generally, the components and arrangement of the components included in system 100 may vary. Thus, system 100 may include other components that perform or assist in the performance of one or more processes consistent with the disclosed embodiments.

Display device 102 may be used by a user 112 to view one or more virtual displays on an object 114 associated with a cryptographic symbol 116. While only one object 114 and cryptographic symbol 116 are shown, it will be understood that more than one object 114 and/or cryptographic symbol 116, including more than one cryptographic symbol 116 associated with a single object 114 and/or more than one objects 114 associated with a single cryptographic symbol 116, are possible as well. For example, in some embodiments, object 114 may have multiple surfaces, and each surface may be associated with a cryptographic symbol 116.

Object 114 may take any number of forms, including but not limited to a product for sale, an item in a museum or educational setting, a component in an employment or industrial setting, etc. For example, object 114 may take the form of an automobile, a food item, a book, a work of art, a sign or plaque, a door, a window, etc. Object 114 may take other forms as well.

Cryptographic symbol 116 may be any symbol that represents encrypted information. For example, cryptographic symbol 116 may take the form of a machine-readable optical label, such as a one-dimensional or two-dimensional bar code. Example cryptographic symbols include Code 128, Code 39, PDF417, Code 93, Codabar, Aztec Code, MSI, Data Matrix, QR Code, Interleaved 2-of-5, Universal Product Code (UPC), EAN Code, and GS1 DataBar bar codes. Other cryptographic symbols are possible as well. In some embodiments, cryptographic symbol 116 may represent encrypted information associated with object 114, such as a unique or semi-unique identifier identifying the object 114.

In some embodiments, cryptographic symbol 116 may take the form of a physical symbol, such as a film, sticker, label, and/or other material that can be adhered or otherwise affixed to a surface of object 114. The material may be affixed with a permanent, semi-permanent, and/or removable adhesive. In some embodiments, the cryptographic symbol may be substantially reflective of light of wavelengths in a certain spectrum and substantially non-reflective of light of wavelengths in another spectrum. For example, the cryptographic symbol may be substantially reflective of light of wavelengths in the non-visible spectrum (e.g., less than 390 nm and/or greater than 700 nm) and substantially non-reflective of light of wavelengths in the visible spectrum (e.g., between 390 nm and 700 nm), such that the cryptographic symbol appears substantially invisible to user 112 when viewed directly by user 112, unaided by display device 102. For example, the cryptographic symbol may be substantially reflective of infrared light (e.g., light of wavelengths greater than 700 nm and less than 1 mm) and substantially non-reflective of light less than 700 nm. Cryptographic symbol 116 may take other forms as well.

Display device 102 may be one or more computing devices configured to render virtual displays based on cryptographic symbol 116. Display device 102 may take a variety of forms, such as a mobile device, a cellular phone, a smartphone, a tablet, a laptop, and/or a wearable device, such as glasses and/or a watch. Display device 102 may take other forms as well, such as a projector.

In some embodiments, display device 102 may be configured to emit light towards object 114 and/or cryptographic symbol 116 and receive a reflection of the emitted light from the cryptographic symbol 116. The emitted light may be, for example, light of a wavelength outside of the visible spectrum (e.g., less than 390 nm and/or greater than 700 nm), such as infrared light (e.g., light of wavelengths greater than 700 nm and less than 1 mm). Additionally or alternatively, display device 102 may be configured to receive a reflection of infrared light, e.g., such as a reflection of infrared light emitted by the sun. Based on the reflection, display device 102 may detect cryptographic symbol 116 and decrypt cryptographic symbol 116 to determine an identifier. The identifier may be associated with object 114 and/or a surface of object 114. In some embodiments, the identifier may be a unique or semi-unique identifier that identifies object 114 and/or a surface of object 114.

Based on the identifier, display device 102 may generate a first virtual display, and display device 102 may render the first virtual display on an image of object 114. For example, display device 102 may render the first virtual display on the image so that the first virtual display appears to be on a surface of object 114. Rendering the first virtual display on an image of object 114 and/or the surface of object 114 may involve, for example, rendering the first virtual display to appear overlaid on object 114 and/or the surface in the image. For example, display device 102 may render an image of object 114 and/or the surface, and display device 102 may render the first virtual display along with the image, such that the first virtual display appears to user 112 to be printed on, marked on, drawn on, attached to, etc., some or all of object 114. The first virtual display may include content associated with object 114. Display device 102 may be a graphical user interface.

Alternatively, display device 102 may comprise a heads up display, for example, like display device 604. Based on the identifier, display device 102 may generate a first virtual display, and display device 102 may render the first virtual display on a heads up display, allowing user 112 to view an augmented reality. For example, display device 102 may render the first virtual display such that the first virtual display appears to user 112 to be printed on, marked on, drawn on, attached to, next to, above, below etc., some or all of object 114 when viewed through display device 102. The first virtual display may include content associated with object 114.

As a further alternative, display device 102 may comprise a projector that projects the first virtual display onto the surface of object 114. In such instances, the first virtual display is no longer virtual; that is, it is projected onto the object in real life and the display is visible to others.

Virtual display system 104 may be one or more computing devices configured to facilitate generation of virtual displays. In some embodiments, for example, virtual display system 104 may be configured to receive from display device 102 an identifier decrypted from cryptographic symbol 116 and, in response, provide to display device 102 content to be included in a virtual display. Virtual display system 104 may provide to display device 102 the content itself and/or an indication of the content. For example, in some embodiments, the content provided to display device 102 may be content generated and/or maintained at virtual display system 104, and virtual display system 104 may provide to display device 102 the content itself and/or a uniform resource locator (URL) and/or other indication of content stored at virtual display system 104. As another example, the content may be content generated and/or maintained elsewhere in network 110, and virtual display system 104 may provide to display device 102 a URL and/or other indication of content stored elsewhere in network 110, such as at virtual display content source(s) 108 and/or virtual display content management system 106.

Virtual display content source(s) 108 may be one or more computing devices configured to generate and/or maintain content for use in virtual displays. The content may include, for example, content associated with object 114 and/or user 112. In some embodiments, virtual display content source(s) 108 may be associated with one or more entities, such as advertisers, financial institutions, product manufacturers, or other entities. Virtual display content source(s) 108 may take other forms as well.

In some embodiments, virtual display content source(s) 108 may take the form of one or more servers or databases, such as Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s). Alternatively or additionally, virtual display content source(s) 108 may include cloud-based storage accessible by virtual display system 104, virtual display content management system 106, and/or display device 102 over network 110 and/or another network.

In some embodiments, virtual display content source(s) 108 may be configured to aggregate information from one or more other entities, such as one or more servers in network 110 and/or system 100. Alternatively or additionally, virtual display content source(s) 108 may be included in and/or otherwise associated with one or more such sources. While virtual display content management system 108 is shown separately, in some embodiments virtual display content management system 108 may be included in and/or otherwise associated with virtual display system 104, virtual display content management system 106, display device, and/or another entity in network 110 and/or system 100.

Virtual display content management system 108 may be one or more computing devices configured to manage content and virtual displays. In some embodiments, virtual display content management system 108 may be configured to generate one or more graphical user interfaces or other input/output mechanisms through which a user of virtual display content management system 108 may manage content and/or virtual displays.

Managing content may involve, for example, creating content, maintaining content, and/or accessing content stored elsewhere in network 110, such as at virtual display content source(s) 108 and/or at virtual display system 104. Managing virtual displays may involve, for example, creating, maintaining, and/or selecting content for virtual displays, creating, maintaining, and/or designing configurations and/or layouts for virtual displays, and/or maintaining preferences for virtual displays.

Content for a virtual display may include any content used to generate and/or render a virtual display. For example, content for a virtual display may include content associated with object 114 and/or user 112. Configuration and/or layout for a virtual display may include an arrangement of content within the virtual display, one or more selectable features in a virtual display, colors, fonts, or other appearance aspects of a virtual display, etc. Preferences for a virtual display may include preferences on any aspect of a virtual display, including preferences for content, configuration, and/or layout. In some embodiments, preferences may be tailored to user 112 and/or object 114 based on input from user 112, input from another entity, information (e.g., purchasing history, demographics, etc.) associated with user 112, information (e.g., pricing information, features, etc.) associated with object 114, a date and/or time, a location, etc. Virtual display content management system 106 may take other forms as well.

Network 114 may be any type of network configured to provide communication between components of system 100. For example, network 114 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries may be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
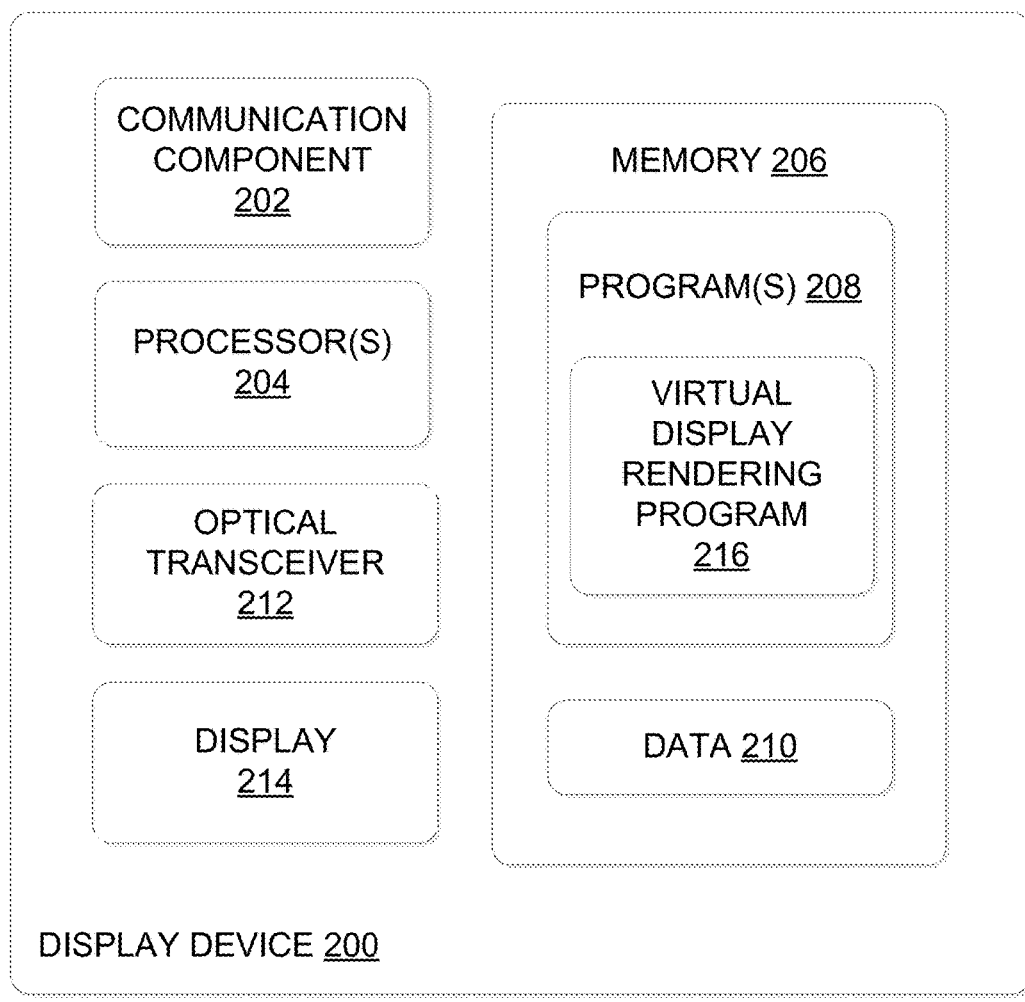
FIG. 2 is a block diagram of an exemplary display device, consistent with disclosed embodiments.

FIG. 2 is a block diagram of an exemplary display device 200, consistent with disclosed embodiments. As shown, display device 200 may include a communication component 202, one or more processor(s) 204, and memory 206 including one or more program(s) 208, data 210, an optical transceiver 212, and a display 214.

Display device 200 may take the form of a mobile device, such as a cellular phone, smartphone, tablet, laptop, projector, etc. Alternatively or additionally, display device 200 may take the form of a wearable device, such as eyeglasses, eyeglasses with an integrated display, a watch, virtual reality headset, virtual reality helmet etc. Other implementations consistent with disclosed embodiments are possible as well. Display device 200 may, for example, be of a form similar to display device 102 described above.

Communication component 202 may be configured to communicate with one or more entities. For example, in some embodiments, communication component 202 may be configured to communicate with a virtual display system, one or more virtual display content source(s), and/or a virtual display content management system, such as virtual display system 104, virtual display content source(s) 108, and/or virtual display content management system 106 describe above. In some embodiments, communication component 202 may be configured to communicate with the virtual display system, virtual display content source(s), and/or virtual display content management system through a network, such as network 110 described above. Communication component 202 may communicate with the virtual display system, virtual display content source(s), and/or virtual display content management system in other manners as well.

Communication component 202 may be configured to communicate with the virtual display system to, for example, provide an identifier decrypted from a cryptographic symbol, such as cryptographic symbol 116 described above, to the virtual display system. Alternatively or additionally, communication component 202 may be configured to communicate with the virtual display system, virtual display content source(s), and/or virtual display content management system to, for example, obtain content for use in generating and/or rendering a virtual display. In some embodiments, the virtual display system may maintain the content in data storage at virtual display system, and communication component 202 may permit the display device 202 to access the content stored at virtual display system. Alternatively or additionally, communication component 202 may be configured to communicate with the virtual display system to receive the content and/or indications of the content from the virtual display system over a network, such as network 110 described above, or another communication channel. Still alternatively or additionally, communication component 202 may be configured to communicate with the virtual display content source(s), virtual display content management system, and/or one or more other entities to, for example, obtain content for use in generating and/or rendering a virtual display.

Communication component 202 may also be configured to communicate with other components. In general, communication component 202 may be configured to provide communication over a network, such as network 110 described above. To this end, communication component 202 may include, for example, one or more digital and/or analog devices that allow display device 200 to communicate with and/or detect other components, such as a network controller and/or wireless adaptor for communicating over the Internet. Other implementations consistent with disclosed embodiments are possible as well.

Processor(s) 204 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of display device 200.

Memory 206 may include one or more storage devices configured to store instructions used by processor(s) 204 to perform functions related to the disclosed embodiments. For example, memory 206 may be configured with software instructions, such as program(s) 208, that may perform one or more operations when executed by processor(s) 204. The disclosed embodiments are not limited to separate programs or computers configured to perform dedicated tasks. For example, memory 206 may include a single program 208 that performs the functions of display device 200, or program(s) 208 may comprise multiple programs. Memory 206 may also store data 210 that is used by program(s) 208. In some embodiments, for example, data 210 may include information for decrypting a cryptographic symbol, generating and/or rendering virtual displays, and/or receiving input from a user of display device 200. Other data 210 is possible as well.

In certain embodiments, memory 206 may store sets of instructions to carry out a virtual display rendering process. For example, as shown, memory 206 may include a virtual display rendering program 216 configured to generate and render virtual displays at display device 200. For example, virtual display rendering program 216 may include instructions to carry out the virtual display rendering processes described below in connection with FIGS. 5, 6, 7 and 8. In some embodiments, virtual display rendering program 216 may take the form of a mobile application executable by display device 200. Any number of virtual display rendering programs 216 are possible, and the disclosed virtual display rendering processes may be performed using any program configured to render a virtual display on a surface of an object, as described above. Other instructions are possible as well. In general, instructions may be executed by processor(s) 204 to perform one or more processes consistent with disclosed embodiments.

Optical transceiver 212 may be any component configured to emit light and detect reflected light. For example, optical transceiver 212 may be configured to emit light towards an object and/or a cryptographic symbol, such as object 114 and/or cryptographic symbol 116 described above. As another example, optical transceiver 212 may be configured to detect a reflection of the emitted light reflected by the cryptographic symbol. In some embodiments, the emitted light may be light of a wavelength outside of the visible spectrum (e.g., less than 390 nm and/or greater than 700 nm), such as infrared light (e.g., light of wavelengths greater than 700 nm and less than 1 mm).

Display 214 may be any display on which a virtual or non-virtual display may be rendered. In some embodiments, for example, virtual display rendering program 216 may be configured to provide output and/or display virtual displays and/or other graphical user interfaces, such as the virtual displays described below in connection with FIGS. 6A-6C and 8A-8C. In some embodiments, such a display 214 may include a screen for displaying a virtual display including graphics and/or text, including but not limited to, liquid crystal displays (LCD), light emitting diode (LED) screens, organic light emitting diode (OLED) screens, liquid crystal on silicon (LCoS), digital micro-mirrors (DMD) and other known display devices. Alternatively or additionally, in some embodiments display device system 200 may further include and/or may be communicatively coupled to one or more digital and/or analog devices configured to receive input, such as a touch-sensitive area, keyboard, buttons, or microphones. In some embodiments, virtual display rendering program 216 may be further configured to receive input. Other components are possible as well. In various embodiments, display 214 may be a projector that renders an image onto the surface of an object.

The components of display device 200 may be implemented in hardware, software, or a combination of both hardware and software, as will be apparent to those skilled in the art. For example, although one or more components of display device 200 may be implemented as computer processing instructions, all or a portion of the functionality of display device 200 may be implemented instead in dedicated electronics hardware.

Figure 3:
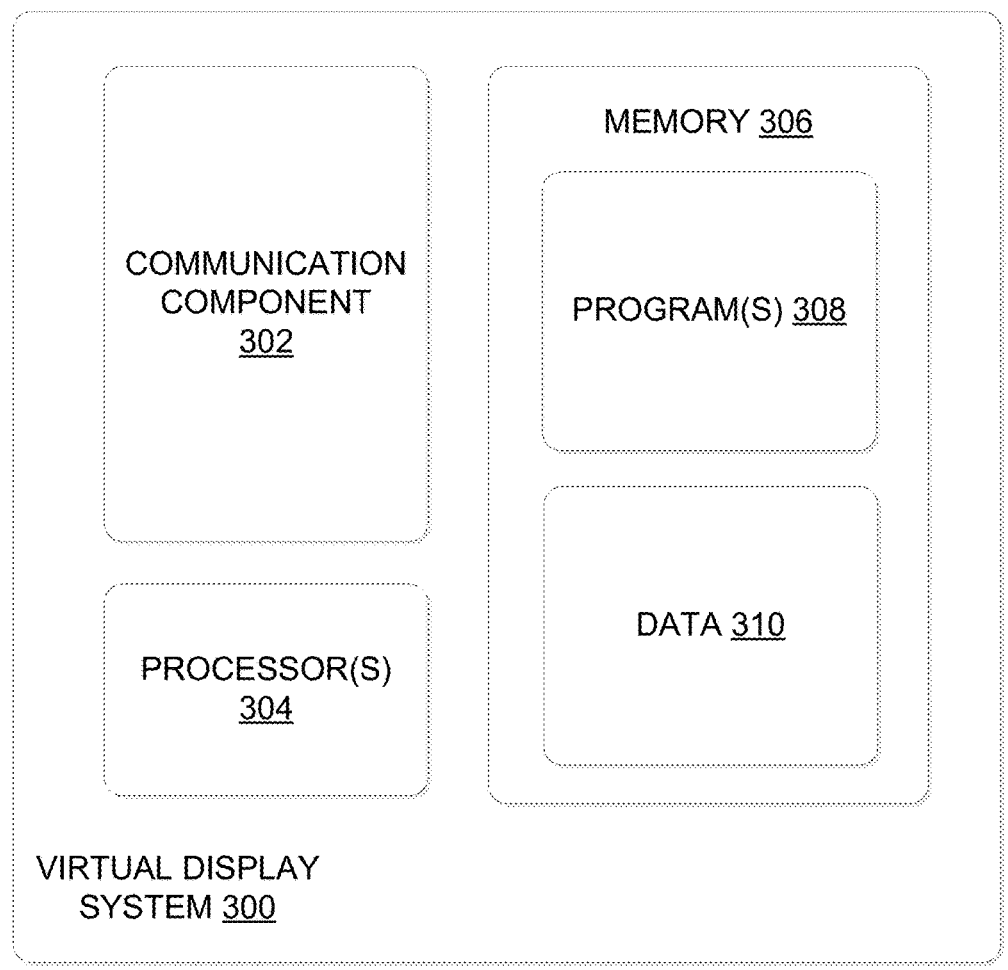
FIG. 3 is a block diagram of an exemplary virtual display system, consistent with disclosed embodiments.

FIG. 3 is a block diagram of an exemplary virtual display system, consistent with disclosed embodiments. As shown, virtual display system 300 may include a communication component 302, one or more processor(s) 304, and memory 306 including one or more program(s) 308 and data 310.

Virtual display system 300 may take the form of a server, general purpose computer, mainframe computer, or any combination of these components. Other implementations consistent with disclosed embodiments are possible as well. Virtual display system 300 may, for example, be similar to virtual display system 104 described above.

Communication component 302 may be configured to communicate with one or more entities. For example, in some embodiments, communication component 302 may be configured to communicate with a display device, one or more virtual display content source(s), and/or a virtual display content management system, such as display device 102, virtual display content source(s) 108, and/or virtual display content management system 106 describe above. In some embodiments, communication component 302 may be configured to communicate with the virtual display system, virtual display content source(s), and/or virtual display content management system through a network, such as network 110 described above. Communication component 302 may communicate with the virtual display system, virtual display content source(s), and/or virtual display content management system in other manners as well.

Communication component 302 may be configured to communicate with the display device to, for example, receive an identifier decrypted from a cryptographic symbol, such as cryptographic symbol 116 described above. Alternatively or additionally, communication component 302 may be configured to communicate with the virtual display content source(s) and/or virtual display content management system to, for example, receive and/or provide content and/or indications of content for use by the display device in generating and/or rendering a virtual display.

In some embodiments, virtual display system 300 may maintain content in data 310 at virtual display system 300, and communication component 302 may permit the display device to access the content stored at virtual display system 300. Alternatively or additionally, communication component 302 may be configured to communicate with the display device to provide the content and/or indications of the content to the display device over a network, such as network 110 described above, or another communication channel. Still alternatively or additionally, communication component 302 may be configured to communicate with the virtual display content source(s), virtual display content management system, and/or one or more other entities to, for example, facilitate provisioning of content and/or indications of content to the display device for use in generating and/or rendering a virtual display.

Communication component 302 may also be configured to communicate with other components. In general, communication component 302 may be configured to provide communication over a network, such as network 110 described above. To this end, communication component 302 may include, for example, one or more digital and/or analog devices that allow virtual display system 300 to communicate with and/or detect other components, such as a network controller and/or wireless adaptor for communicating over the Internet. Other implementations consistent with disclosed embodiments are possible as well.

Processor(s) 304 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of virtual display system 300.

Memory 306 may include one or more storage devices configured to store instructions used by processor(s) 304 to perform functions related to disclosed embodiments. For example, memory 306 may be configured with software instructions, such as program(s) 308, that may perform one or more operations when executed by processor(s) 304. The disclosed embodiments are not limited to separate programs or computers configured to perform dedicated tasks. For example, memory 306 may include a single program 308 that performs the functions of virtual display system 300, or program(s) 308 may comprise multiple programs. Memory 306 may also store data 310 that is used by program(s) 308. In some embodiments, for example, data 310 may include content, indications of content, or other information for use in facilitating rendering of virtual displays at the display device. Other data 310 is possible as well.

The components of virtual display system 300 may be implemented in hardware, software, or a combination of both hardware and software, as will be apparent to those skilled in the art. For example, although one or more components of virtual display system 300 may be implemented as computer processing instructions, all or a portion of the functionality of virtual display system 300 may be implemented instead in dedicated electronics hardware.

Figure 4:
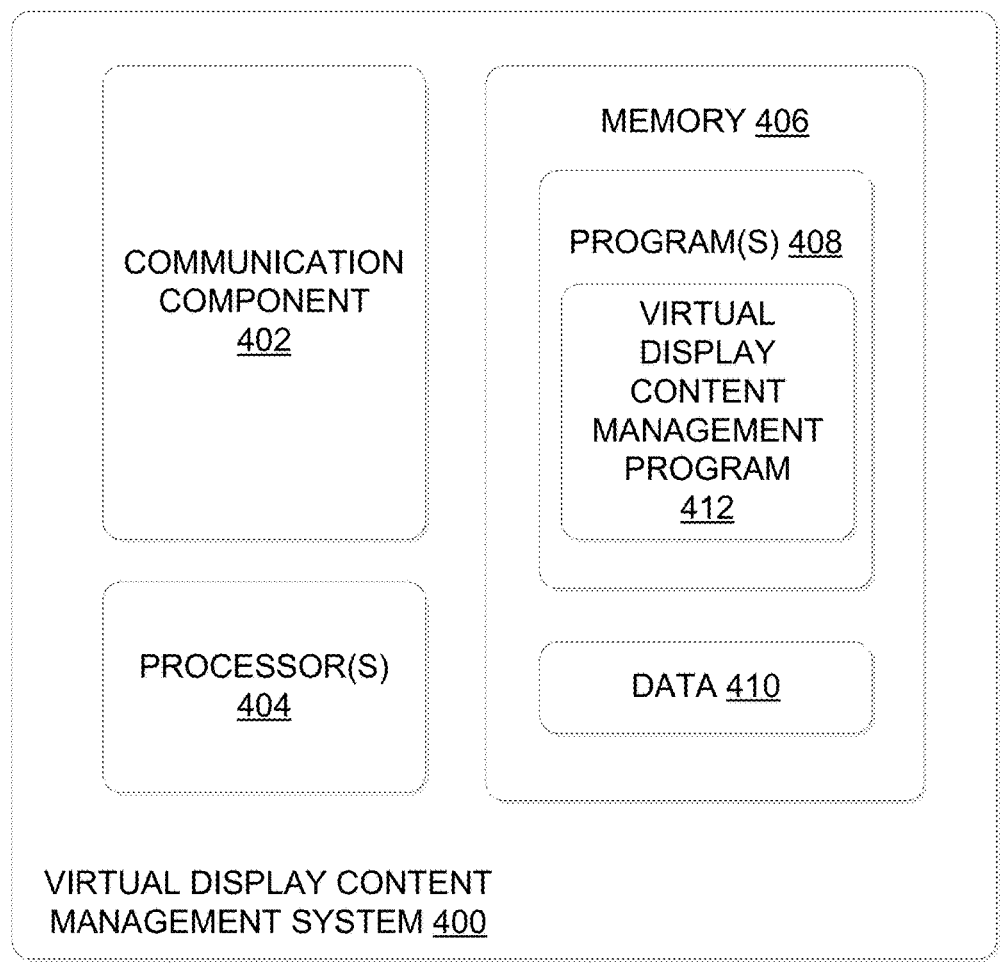
FIG. 4 is a block diagram of an exemplary virtual display content management system, consistent with disclosed embodiments.

FIG. 4 is a block diagram of an exemplary virtual display content management system, consistent with disclosed embodiments. As shown, virtual display content management system 400 may include a communication component 402, one or more processor(s) 404, and memory 406 including one or more program(s) 408 and data 410.

Virtual display content management system 400 may take the form of a server, general purpose computer, mainframe computer, or any combination of these components. Other implementations consistent with disclosed embodiments are possible as well. Virtual display content management system 400 may, for example, be similar to virtual display content management system 106 described above.

Communication component 402 may be configured to communicate with one or more entities. For example, in some embodiments, communication component 402 may be configured to communicate with a display device, one or more virtual display content source(s), and/or a virtual display system, such as display device 102, virtual display content source(s) 108, and/or virtual display system 104 describe above. In some embodiments, communication component 402 may be configured to communicate with the display device, virtual display content source(s), and/or virtual display system through a network, such as network 110 described above. Communication component 402 may communicate with the display device, virtual display content source(s), and/or virtual display system in other manners as well.

Communication component 402 may be configured to communicate with the virtual display content source(s) and/or virtual display system to, for example, receive and/or provide content and/or indications of content for use by the display device in generating and/or rendering a virtual display.

In some embodiments, virtual display content management system 400 may maintain content in data 410 at virtual display content management system 400, and communication component 402 may permit the display device to access the content stored at virtual display content management system 400. Alternatively or additionally, communication component 402 may be configured to communicate with the display device to provide the content and/or indications of the content to the display device over a network, such as network 110 described above, or another communication channel. Still alternatively or additionally, communication component 402 may be configured to communicate with the virtual display content source(s), virtual display system, and/or one or more other entities to, for example, facilitate provision of content and/or indications of content to the display device for use in generating and/or rendering a virtual display.

Communication component 402 may also be configured to communicate with other components. In general, communication component 402 may be configured to provide communication over a network, such as network 110 described above. To this end, communication component 402 may include, for example, one or more digital and/or analog devices that allow virtual display content management system 400 to communicate with and/or detect other components, such as a network controller and/or wireless adaptor for communicating over the Internet. Other implementations consistent with disclosed embodiments are possible as well.

Processor(s) 404 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. The disclosed embodiments are not limited to any type of processor(s) otherwise configured to meet the computing demands required of different components of virtual display content management system 400.

Memory 406 may include one or more storage devices configured to store instructions used by processor(s) 404 to perform functions related to disclosed embodiments. For example, memory 406 may be configured with software instructions, such as program(s) 408, that may perform one or more operations when executed by processor(s) 404. The disclosed embodiments are not limited to separate programs or computers configured to perform dedicated tasks. For example, memory 406 may include a single program 408 that performs the functions of virtual display content management system 400, or program(s) 408 may comprise multiple programs. Memory 406 may also store data 410 that is used by program(s) 408. In some embodiments, for example, data 410 may include content, indications of content, or other information for use in facilitating managing of virtual display content at the virtual display content management system 400. Other data 410 is possible as well.

In certain embodiments, memory 408 may store sets of instructions to carry out a virtual display content management process. For example, as shown, memory 408 may include a virtual display content management program 412 configured to allow a user to manage content for virtual displays at a computing device and/or display device that may be included in and/or communicatively coupled to virtual display content management system 400. For example, virtual display content management program 412 may take the form of a software application executable by and/or in connection with a computing device and/or a display device.

Virtual display content management program 412 may, for example, be configured to provide graphical user interfaces through which a user of virtual display content management system 400 may manage content and/or virtual displays. Managing content may involve, for example, creating content, maintaining content, and/or accessing content stored elsewhere, such as at virtual display content source(s) and/or at a virtual display system.

Managing virtual displays may involve, for example, creating, maintaining, and/or selecting content for virtual displays, creating, maintaining, and/or designing configurations and/or layouts for virtual displays, and/or maintaining preferences for virtual displays.

Content for a virtual display may include any content used to generate and/or render a virtual display. For example, content for a virtual display may include content associated with one or more objects and/or users.

Configuration and/or layout for a virtual display may include an arrangement of content within the virtual display, one or more selectable features in a virtual display, colors, fonts, or other appearance aspects of a virtual display, etc.

Preferences for a virtual display may include preferences on any aspect of a virtual display, including preferences for content, configuration, and/or layout. In some embodiments, preferences may be tailored to a user and/or object based on input from the user, input from another entity, information (e.g., purchasing history, demographics, etc.) associated with the user, information (e.g., pricing information, features, etc.) associated with the object, a date and/or time, a location, etc.

Other instructions are possible as well. In general, instructions may be executed by processor(s) 404 to perform one or more processes consistent with disclosed embodiments.

The components of virtual display content management system 400 may be implemented in hardware, software, or a combination of both hardware and software, as will be apparent to those skilled in the art. For example, although one or more components of virtual display content management system 400 may be implemented as computer processing instructions, all or a portion of the functionality of virtual display content management system 400 may be implemented instead in dedicated electronics hardware.

Virtual display content management system 400 may include more, fewer, and/or different components than those shown. For example, in some embodiments, virtual display content management system 400 may include and/or may be communicatively coupled to one or more computing devices and/or display devices configured to provide output and/or display graphical user interfaces through which a user of virtual display content management system 400 can manage content for virtual displays. In some embodiments, such a computing device and/or display device may include a screen for displaying a graphical and/or text-based user interface, including but not limited to, liquid crystal displays (LCD), light emitting diode (LED) screens, organic light emitting diode (OLED) screens, liquid crystal on silicon (LCoS), digital micro-mirrors (DMD) and other known display devices. As another example, in some embodiments virtual display content management system 400 may include and/or may be communicatively coupled to one or more digital and/or analog devices configured to receive input, such as a touch-sensitive area, keyboard, buttons, or microphones. Other components are possible as well.

Figure 5:
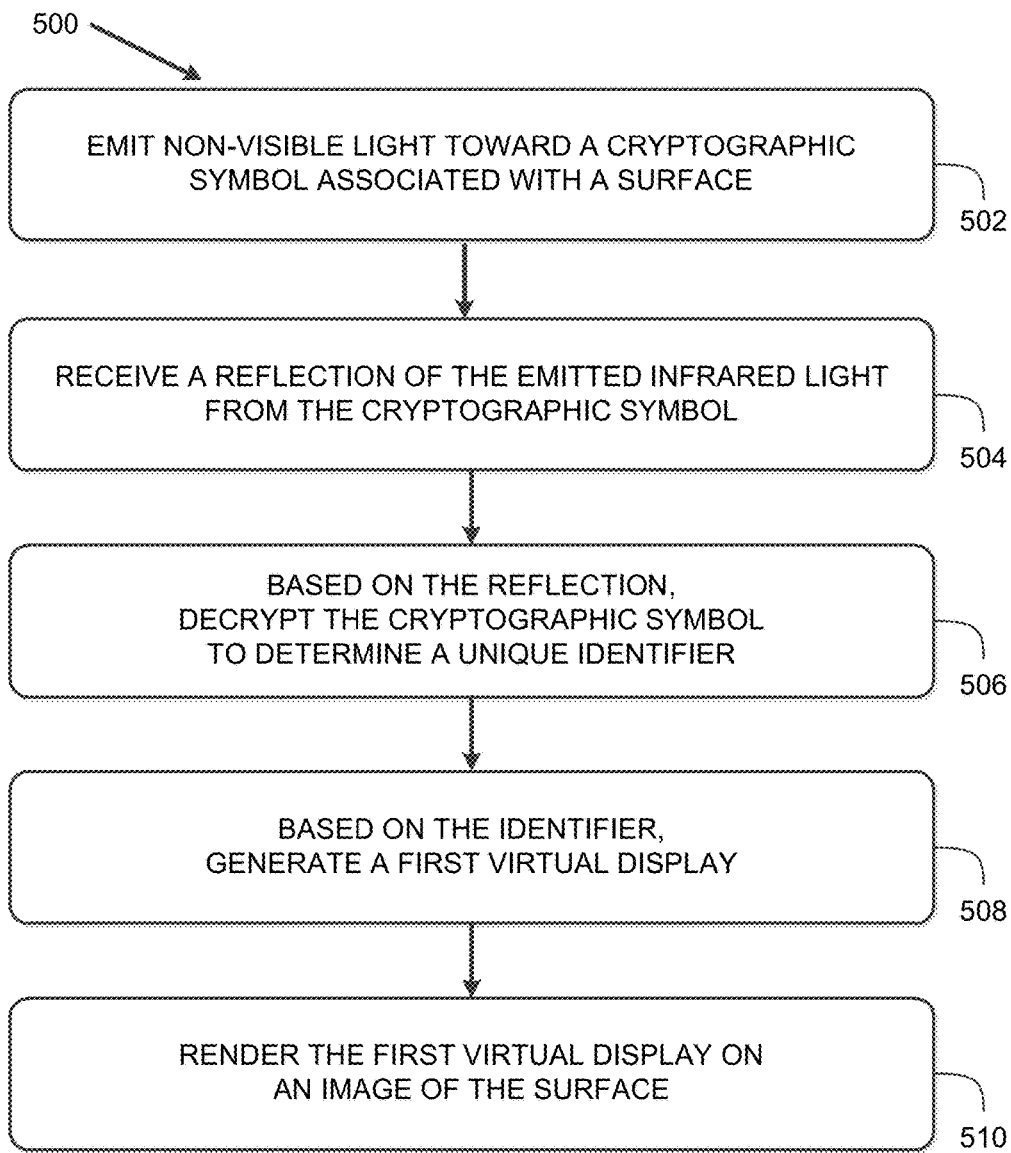
FIG. 5 is a flowchart of an exemplary virtual display rendering process, consistent with disclosed embodiments.

FIG. 5 is a flowchart of an exemplary virtual display rendering process 500, consistent with disclosed embodiments. Virtual display rendering process 500 may be carried out by a display device, such as display devices 102 and 200 described above. FIG. 5 will be explained with reference to FIGS. 6A-6C, which illustrate an exemplary virtual display rendering process, consistent with disclosed embodiments.

As shown, virtual display rendering process 500 begins at step 502 with emitting non-visible light toward a cryptographic symbol associated with a surface. Additionally or alternatively, the source of the non-visible light may be the sun. For example, the non-visible light may be infrared light of wavelengths greater than 700 nm and less than 1 mm. Other wavelengths of non-visible light are possible as well. The surface may be, for example, a surface of an object, such as object 114 described above. The object may take any number of forms, including but not limited to a product for sale, an item in a museum or educational setting, a component in an employment or industrial setting, etc.

Figure 6A:
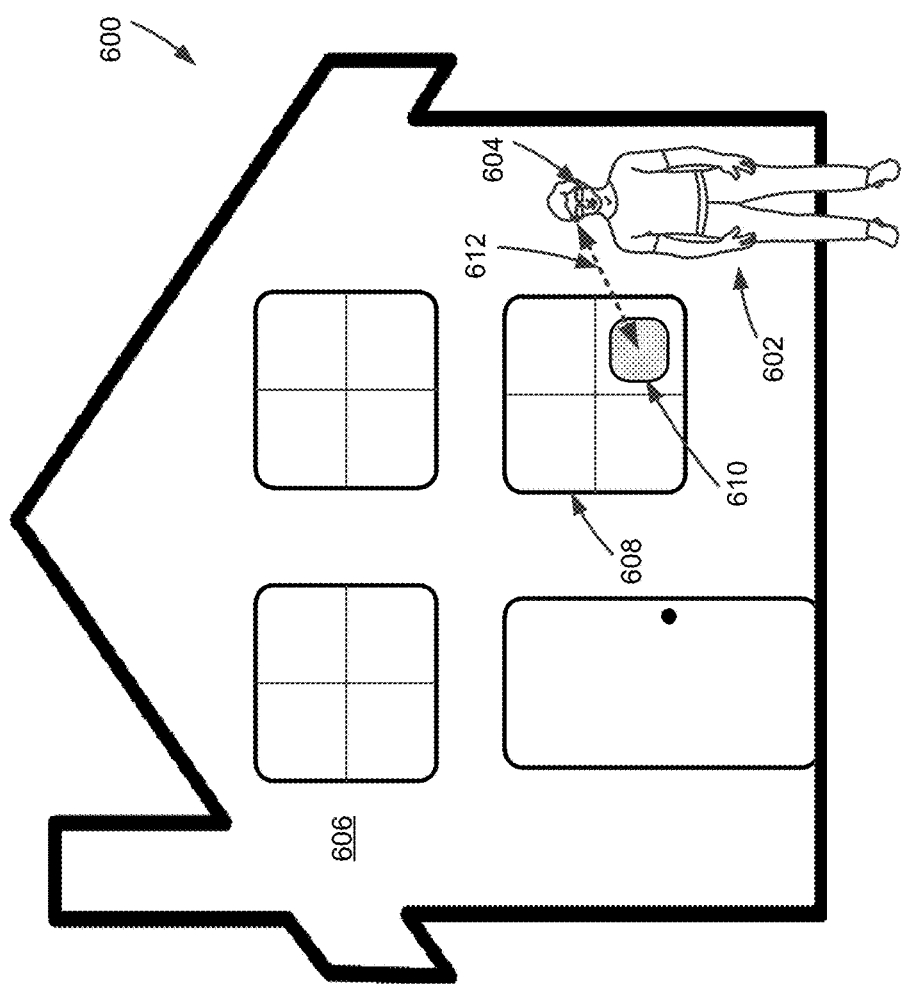
FIGS. 6A-6C illustrate an exemplary virtual display rendering process, consistent with disclosed embodiments.

An example environment 600 in which a virtual display rendering process may be performed is shown in FIG. 6A. As shown, a user 602 of a display device 604 may be in environment 600, which includes one or more objects, such as object 606 shown as a house. While display device 604 is shown to be a wearable device in the form of eyeglasses with an integrated display, such as glasses with a heads up display, display device may take other forms as well, including other wearable and/or computing devices. Object 606 may include one or more surfaces, including surface 608 shown as a window. In some embodiments, surface 608 may be substantially non-reflective of light of wavelengths in the visible spectrum (e.g., between 390 nm and 700 nm), such that surface 608 appears substantially invisible to user 602 when viewed directly by user 602, unaided by display device 604. Alternatively or additionally, surface 608 may be substantially non-reflective to light of other wavelengths, such as wavelengths of light emitted by the display device. In various embodiments, display device 604 may be a projector and may project an image onto object 606.

As shown, a cryptographic symbol 610 may be affixed to surface 608. Cryptographic symbol 610 may be any symbol that represents encrypted information. For example, cryptographic symbol 610 may take the form of a machine-readable optical label, such as a one-dimensional or two-dimensional bar code. Example cryptographic symbols include Code 128, Code 39, PDF417, Code 93, Codabar, Aztec Code, MSI, Data Matrix, QR Code, Interleaved 2-of-5, Universal Product Code (UPC), EAN Code, and GS1 DataBar bar codes.

In some embodiments, cryptographic symbol 610 may represent encrypted information associated with object 606, such as a unique or semi-unique identifier identifying the object 606. In some embodiments, cryptographic symbol 610 may take the form of a physical symbol, such as a film, sticker, label, and/or other material that can be adhered or otherwise affixed to surface 608 of object 606. The material may be adhered with a permanent, semi-permanent, and/or removable adhesive. In some embodiments, cryptographic symbol 610 may be substantially reflective of light of wavelengths in a certain spectrum and substantially non-reflective of light of wavelengths in another spectrum. For example, cryptographic symbol 610 may be substantially reflective of light of wavelengths in the non-visible spectrum (e.g., less than 390 nm and/or greater than 700 nm) and substantially non-reflective of light of wavelengths in the visible spectrum (e.g., between 390 nm and 700 nm), such that cryptographic symbol 610 appears substantially invisible to user 602 when viewed directly by user 602, unaided by display device 604. For example, cryptographic symbol 610 may be substantially reflective of infrared light (e.g., light of wavelengths greater than 700 nm and less than 1 mm) and substantially non-reflective of light less than 700 nm. Cryptographic symbol 610 may take other forms as well.

As described in step 502, display device 604 may emit infrared light 612 toward cryptographic symbol 610 associated with surface 608 of object 606. In some embodiments, display device 604 may emit infrared light in response to an input from user 602, continuously, periodically, or according to any other schedule or input.

Returning to FIG. 5, virtual display rendering process 500 continues at step 504 with receiving a reflection of the emitted infrared light from the cryptographic symbol. In some embodiments, the cryptographic symbol may be substantially reflective of infrared light, while the surface may be substantially non-reflective of and/or significantly less reflective than the cryptographic symbol of infrared light. As shown in FIG. 6A, for example, display device 604 may receive a reflection of emitted infrared light 612. The reflection may be reflected by cryptographic symbol 610. In embodiments where surface 608 is substantially non-reflective of and/or significantly less reflective than cryptographic symbol 610 of infrared light, the reflection of emitted infrared light 612 may be substantially reflected by cryptographic symbol 610 and not surface 608, such that display device 604 may detect cryptographic symbol 610 on surface 608 based on the reflection of emitted infrared light 612.

Returning to FIG. 5, at step 506 virtual display rendering process 500 further includes, based on the reflection, decrypting the cryptographic symbol to determine a unique identifier. The unique identifier may be, for example, a unique or semi-unique identifier that identifies the object and/or the surface, such as object 606 and/or surface 608 shown in FIG. 6A. Decryption of the cryptographic symbol may depend on the form cryptographic symbol takes. For example, where the cryptographic symbol is a QR code, decrypting the cryptographic symbol may involve decrypting the QR code according to the QR code symbology to produce decrypted information. As another example, where the cryptographic symbol is a PDF417 bar code, decrypting the cryptographic symbol may involve decrypting the PDF417 bar code according to the PDF417 symbology to produce decrypted information.

At step 508, virtual display rendering process 500 further includes, based on the identifier, generating a first virtual display. In some embodiments, generating the first virtual display may involve providing the identifier to a remote system, such as a virtual display system. In response, display device may receive from the remote system indications of content to be included in the first virtual display. In some embodiments, the indications of content may include the content itself. Alternatively or additionally, in some embodiments the indications may include one or more uniform resource locators (URLs) pointing to content stored at the virtual display system, one or more virtual display content source(s), and/or a virtual display content management system.

Virtual display rendering process 500 further includes at step 510 rendering the first virtual display. In some embodiments, the display device may render the first virtual display to appear overlaid on the surface. For example, the display device may render an image of the object and/or the surface, and the display device may render the first virtual display along with the image, such that the first virtual display appears to the user to be printed on, marked on, drawn on, attached to, etc., some or all of the object and/or surface. The virtual display may be rendered on the image of the object in a graphical user interface. The virtual display may be rendered using a heads up device so that it appears to the user that the virtual display is printed on, marked on, drawn on, attached to, etc., some or all of the object and/or surface. Alternatively or additionally, the virtual display may be projected onto the surface of the object so that the virtual display is no longer virtual and is visible to others.

In some embodiments, display device may detect the edges of the surface and render the first virtual display to appear within the edges of the surface, as depicted in an image by display device. As another example, the display device may detect an orientation of the surface relative to the display device, and the display device may render the first virtual display to appear overlaid on the surface in an image based on the detected orientation. As still another example, the display device may detect a variation in lighting across the surface, and the display device may render the first virtual display to appear to exhibit a similar variation in lighting, based on the detected variation. Other examples are possible as well.

Figure 6B:
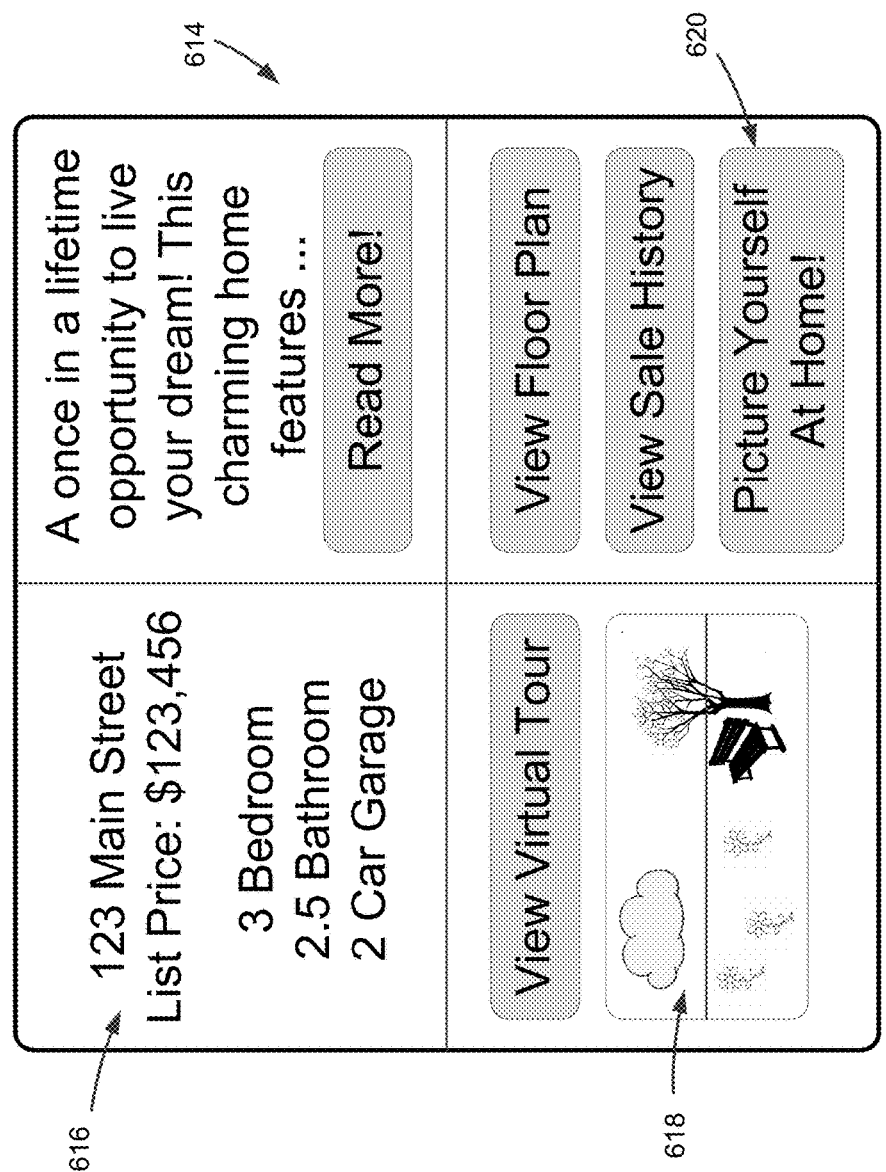

An example first virtual display 614 rendered by display device 604 is shown in FIG. 6B. As shown, first virtual display 614 may be rendered to appear overlaid on surface 608, the window of the house. First virtual display 614 may include textual content 616 and/or graphical content 618 associated with object 606. While certain textual and/or graphical content 616, 618 is shown, it will be understood that first virtual display 614 shown in FIG. 6B is merely illustrative and that other textual and/or graphical content 616, 618 and/or other configurations or layouts of first virtual display 614 are possible as well.

In some embodiments, first virtual display 614 may include one or more selectable features, such as selectable feature 620. A selectable feature may be any textual and/or graphical content through which user 602 may make a selection in first virtual display 614. As shown, selectable feature 620 permits user 602 to select to "Picture Yourself at Home!" Display device 604 may be configured to detect a selection of selectable feature 620 by user 602. In some embodiments, user 602 may select selectable feature 620 through one or more of a touch input, a voice input, and/or a gesture or movement detectable by display device 604.

Figure 6C:
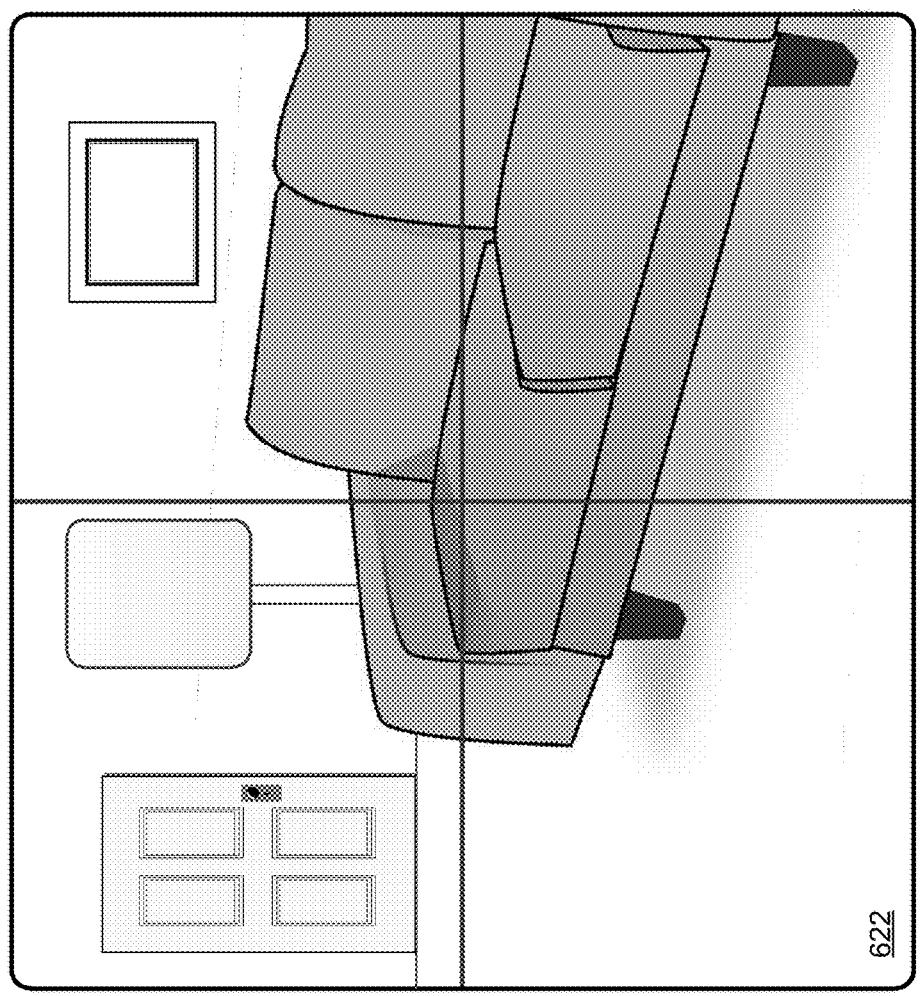

Upon selection of selectable feature 620 by user 602, display device 604 may render a second virtual display 622, as shown in FIG. 6C. Display device 604 may render second virtual display 622 in any of the manners described above in connection with first virtual display 614.

Second virtual display 622 may, like first virtual display 614, be rendered to appear overlaid on surface 608, the window of the house. Second virtual display 622 may include textual content and/or graphical content associated with object 606 and/or one or more selectable features. While certain textual and/or graphical content is shown, it will be understood that second virtual display 622 shown in FIG. 6C is merely illustrative and that other textual and/or graphical content and/or other configurations or layouts of second virtual display 622 are possible as well.

Figure 7:
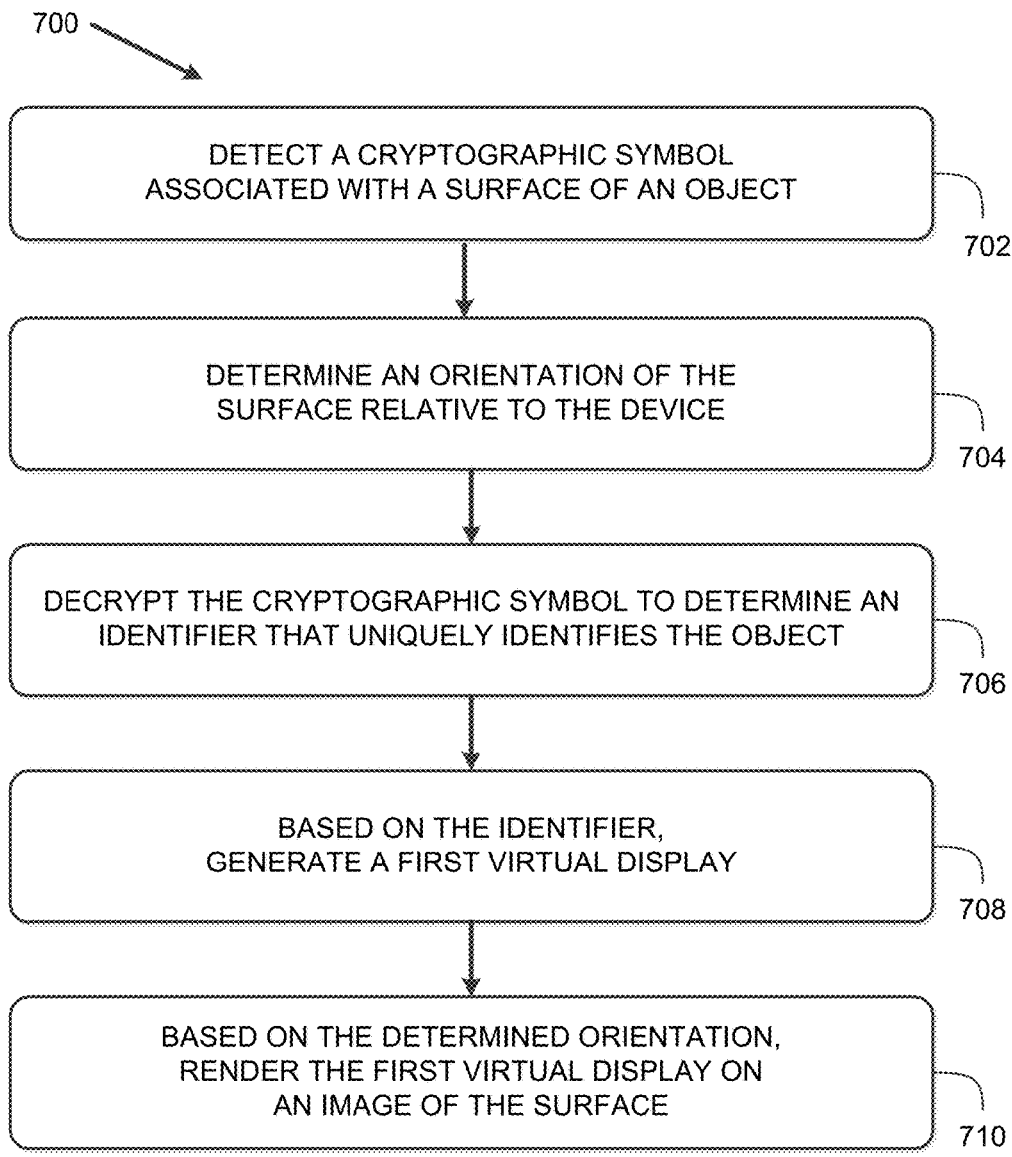
FIG. 7 is a flowchart of another exemplary virtual display rendering process, consistent with disclosed embodiments.

FIG. 7 is a flowchart of another exemplary virtual display rendering process 700, consistent with disclosed embodiments. Virtual display rendering process 700 may be carried out by a display device, such as display devices 102 and 200 described above. FIG. 7 will be explained with reference to FIGS. 8A-8C, which illustrate an exemplary virtual display rendering process, consistent with disclosed embodiments.

As shown, virtual display rendering process 700 begins at step 702 with detecting a cryptographic symbol associated with a surface of an object using light of wavelengths outside of the visible spectrum. The cryptographic symbol and the object may take any of the forms described above in connection with cryptographic symbol 610 and object 606. The light of wavelengths outside the visible spectrum may include, for example, light having wavelengths less than 390 nm and/or greater than 700 nm. In some embodiments, the light may be infrared light (for example, light have wavelengths greater than 700 nm and less than 1 mm).

Figure 8A:
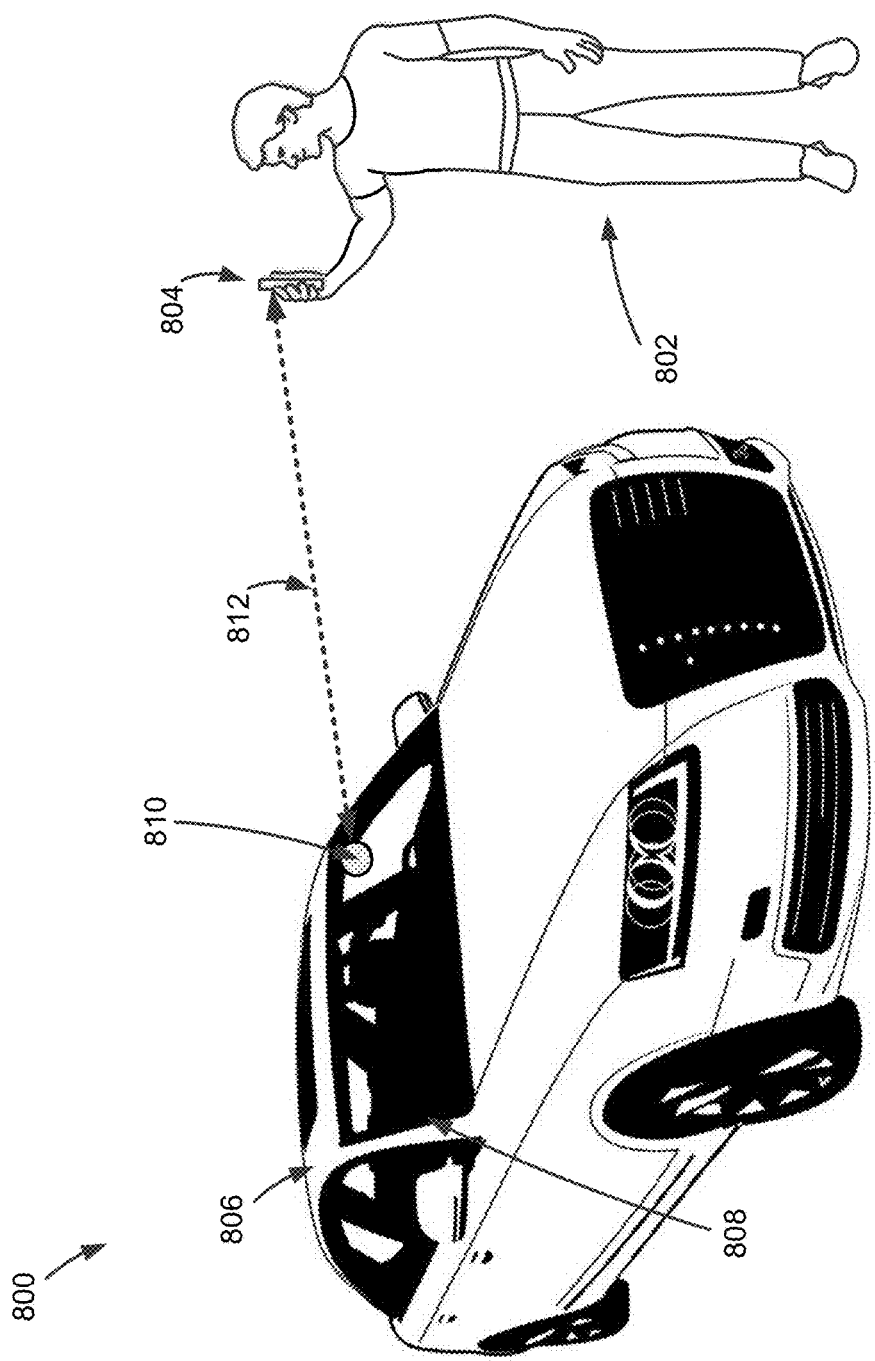
FIGS. 8A-8C illustrate an exemplary virtual display rendering process, consistent with disclosed embodiments.

An example environment 800 in which a virtual display rendering process may be performed is shown in FIG. 8A. As shown, a user 802 of a display device 804 may be in environment 800, which includes one or more objects, such as object 806 shown as an automobile. While display device 804 is shown to be a computing device in the form of a smartphone, display device 804 may take other forms as well, including other wearable and/or computing devices. Object 806 may include one or more surfaces, including surface 808 shown as a windshield. In some embodiments, surface 808 may be substantially non-reflective of light of wavelengths in the visible spectrum (e.g., between 390 nm and 700 nm), such that surface 808 appears substantially invisible to user 802 when viewed directly by user 802, unaided by display device 804. Alternatively or additionally, surface 808 may be substantially non-reflective of light of other wavelengths, such as wavelengths of light emitted by display device 804.

As shown, a cryptographic symbol 810 may be affixed to surface 808. Cryptographic symbol 810 may be any symbol that represents encrypted information. In some embodiments, cryptographic symbol 810 may represent encrypted information associated with object 806 and/or surface 808, such as a unique or semi-unique identifier identifying the object 806 and/or surface 808. Cryptographic symbol 810 may take any of the forms described above in connection with cryptographic symbol 610.

Display device 804 may emit light 812 toward cryptographic symbol 810 associated with surface 808 of object 806. The light may be, for example, light of wavelengths outside of the visible spectrum, such as infrared light. In some embodiments, display device 804 may emit light in response to an input from user 802, continuously, periodically, or according to any other schedule or input. Once the light has been emitted, display device 804 may receive a reflection of the emitted light from cryptographic symbol 810. In some embodiments, surface 808 may be substantially non-reflective of and/or significantly less reflective than cryptographic symbol 810 of emitted light 812, such that the reflection of emitted light 812 may be substantially reflected by cryptographic symbol 810 and not by surface 808. Accordingly, display device 804 may detect cryptographic symbol 810 on surface 808 based on the reflection of emitted light 812 by cryptographic symbol 810.

Returning to FIG. 7, virtual display rendering process 700 continues at step 704 with determining an orientation of the surface relative to the device.

In some embodiments, the display device may determine the orientation by detecting a distortion of the cryptographic symbol. For example, the display device may store and/or access a library of possible cryptographic symbols. By comparing the detected cryptographic symbol to those in the library, display device may determine a closest match for the detected cryptographic symbol, and distortion in the detected cryptographic symbol relative to the matched cryptographic symbol may be used by the display device to determine the orientation.

As another example, the display device may store and/or access rules governing cryptographic symbols (e.g., rules governing spacing between elements in cryptographic symbols), and the display device may determine distortion of the detected cryptographic symbol based on deviation of the detected cryptographic symbol from the rules. The determined distortion may be used by the display device to determine the orientation.

As still another example, the display device may use computer vision to recognize the surface and/or the object in order to determine the orientation. For instance, the display device may employ one or more of image processing techniques, image analysis techniques, machine vision techniques, and/or pattern recognition techniques to detect the surface and determine the orientation of the display device relative to the surface. In some embodiments, the display device may use, for example, three-dimensional pose estimation to determine the pose of the surface relative to the display device. The display device may determine the orientation in other manners as well.

Returning to FIG. 7, at step 706 virtual display rendering process 700 further includes decrypting the cryptographic symbol to determine an identifier that uniquely identifies the object. The display device may decrypt the cryptographic symbol in any of the manner described above in connection with step 506.

Virtual display rendering process 700 continues at step 708 with, based on the identifier, generating a first virtual display. In some embodiments, generating the first visual display may involve providing the identifier to a remote system, such as a virtual display system. In response, display device may receive from the remote system indications of content to be included in the first virtual display. In some embodiments, the indications of content may include the content itself. Alternatively or additionally, in some embodiments the indications may include one or more uniform resource locators (URLs) pointing to content stored at the virtual display system, one or more virtual display content source(s), and/or a virtual display content management system.

Virtual display rendering process 700 continues at step 710 with, based on the determined orientation, rendering the first virtual display on the surface. In some embodiments, the display device may render the first virtual display to appear overlaid on the surface. Alternatively or additionally, in some embodiments the display device may detect a variation in lighting across the surface, and the display device may render the first virtual display to appear to exhibit a similar variation in lighting, based on the detected variation. Other examples are possible as well.

Figure 8B:
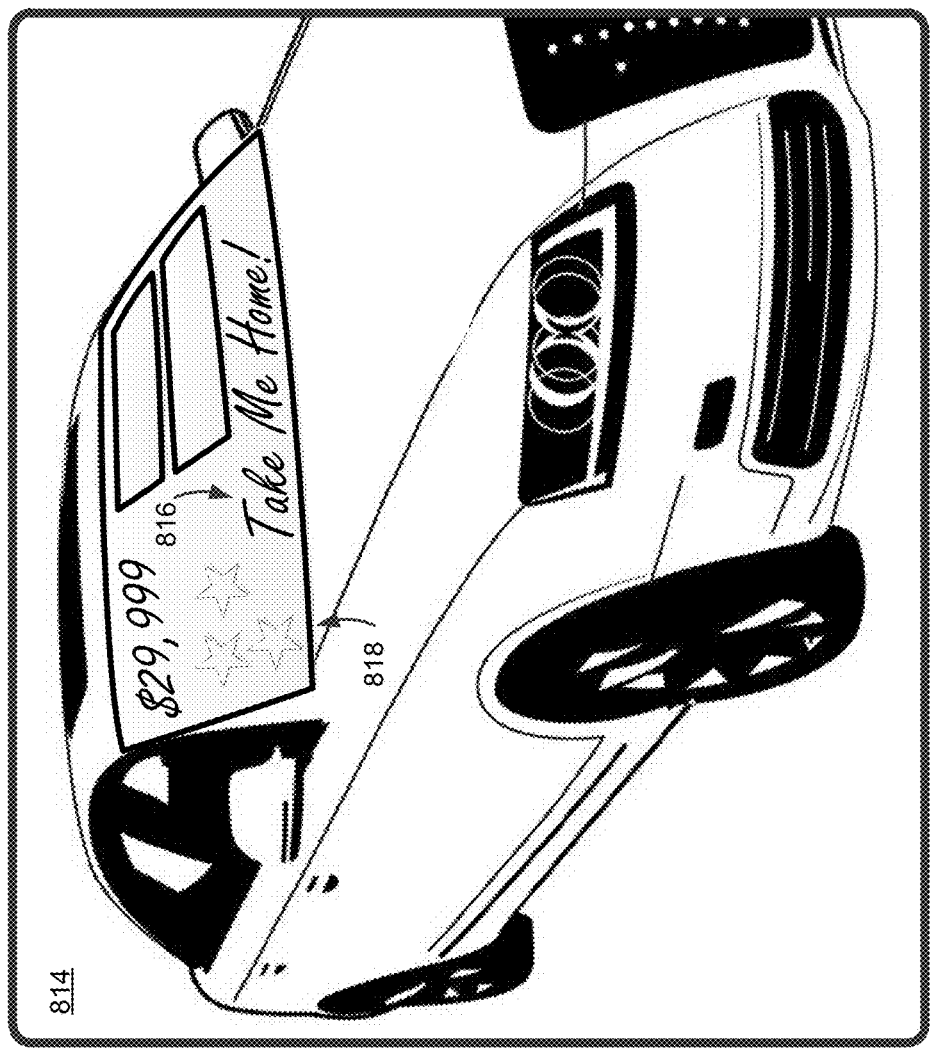

An example first virtual display 814 rendered by display device 804 is shown in FIG. 8B. As shown, first virtual display 814 may be rendered to appear overlaid on surface 808, the windshield of the automobile. Additionally or alternatively, the virtual display may be projected onto the surface of the object, such that it is no longer a virtual display, but is instead an actual display visible to others.

First virtual display 814 may include textual content 816 and/or graphical content 818 associated with object 806. While certain textual and/or graphical content 816, 818 is shown, it will be understood that first virtual display 814 shown in FIG. 8B is merely illustrative and that other textual and/or graphical content 816, 818 and/or other configurations or layouts of first virtual display 814 are possible as well.

In some embodiments, first virtual display 814 may additionally include one or more selectable features. A selectable feature may be any textual and/or graphical content through which user 802 may make a selection in first virtual display 814. In some embodiments, user 802 may select a selectable feature through one or more of a touch input, a voice input, and/or a gesture or movement detectable by display device 804.

In some embodiments, once the first virtual display 814 has been rendered by display device 804, display device 804 may detect that the display device 804 has moved relative to object 806 and/or surface 808, such that an orientation of the display device 804 relative to object 806 and/or surface 808 has changed. Display device 804 may be further configured to determine an adjusted orientation of the display device relative to the surface. For example, display device 804 may determine the adjusted orientation of the display device relative to the surface in any of the manners described in step 704. Based on the adjusted orientation, display device 804 may re-render first virtual display 814 based on the adjusted orientation.

Figure 8C:
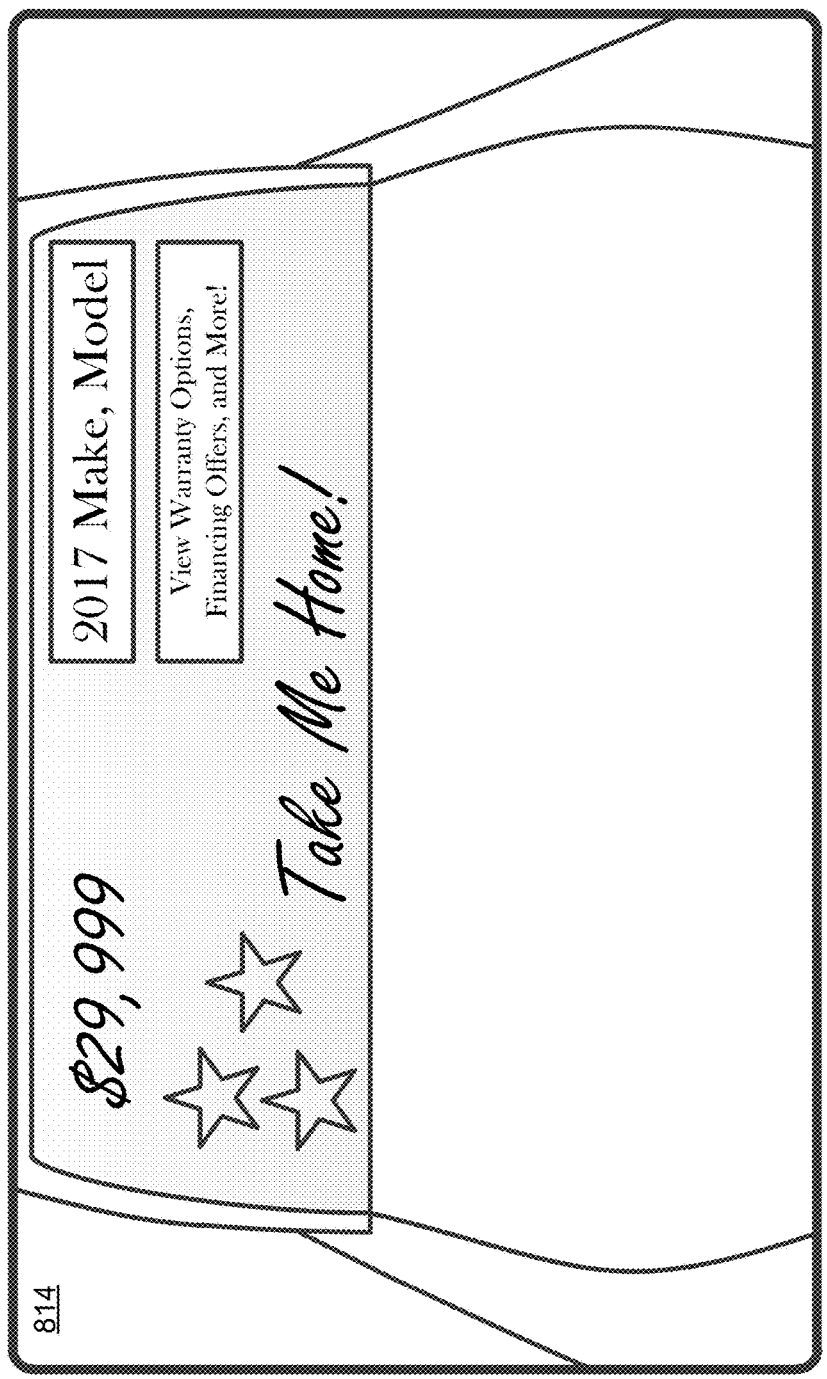

An example re-rendering of first virtual display 814 is shown in FIG. 8C. Display device 804 realizes that display device 804 has moved relative to surface 808. For example, user 802 may have moved to be in front of object 806 and display device 804 may be facing surface 808. Upon determining the adjusted orientation of display device 804, display device 804 may re-render first virtual display 14 as shown. The re-rendering may, for example, maintain an appearance of first virtual display 814 as overlaying surface 808.

It will be understood that the virtual displays described above, including their contents, are merely illustrative and are not meant to be limiting. That is, other virtual displays, including their contents, are possible as well.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A display device, comprising: one or more processors; and one or more data storage devices storing instructions that, when executed by the one or more processors, cause the display device to perform operations comprising: emitting infrared light toward a cryptographic symbol associated with a surface; receiving a reflection of the emitted infrared light from the cryptographic symbol; based on the reflection, decrypting the cryptographic symbol to determine a unique identifier; based on the identifier, generating a first virtual display; and rendering the first virtual display on an image of the surface, wherein the image is projected onto the surface.

2. The display device of claim 1, wherein the cryptographic symbol is affixed to the surface.

3. The display device of claim 1, wherein the cryptographic symbol is substantially non-reflective of light of wavelengths in the visible spectrum.

4. The display device of claim 1, wherein:
the surface is associated with an object; and
the identifier uniquely identifies the object.

5. The display device of claim 4, wherein the first virtual display comprises content associated with the object.

6. The display device of claim 1, wherein the surface is substantially non-reflective of light of wavelengths in the visible spectrum.

7. The display device of claim 6, wherein the surface comprises a window.

8. The display device of claim 1, wherein the display device comprises a graphical user interface.

9. The display device of claim 1, wherein the display device comprises a mobile device.

10. The device of claim 1, wherein generating the first virtual display comprises:
providing the identifier to a remote system; and
receiving from the remote system indications of content to be included in the first virtual display.

11. The display device of claim 1, wherein rendering the first virtual display on an image of the surface comprises rendering the first virtual display to appear overlaid on the surface in the image.

12. The display device of claim 1, wherein:
the operations further comprise determining an orientation of the surface relative to the device; and
rendering the display comprises rendering the first virtual display based on the orientation.

13. The display device of claim 12, wherein determining the orientation comprises detecting a distortion of the cryptographic symbol.

14. The display device of claim 12, wherein determining the orientation comprises using computer vision to recognize the surface.

15. The display device of claim 12, wherein the operations further comprise:
determining an adjusted orientation of the surface relative to the device; and
re-rendering the first virtual display based on the adjusted orientation.

16. The display device of claim 1, wherein:
the operations further comprise determining a variation in lighting across the surface; and
rendering the first virtual display comprises rendering the first virtual display based on the variation in lighting.

17. The display device of claim 1, wherein the first virtual display comprises a selectable feature.

18. The display device of claim 17, the operations further comprise:
detecting a selection of the selectable feature; and
based on the selection, rendering a second virtual display.

19. The display device of claim 17, wherein detecting the selection comprises
receiving the selection from a user of the device.

20. A display device, comprising: one or more processors; and one or more data storage devices storing instructions that, when executed by the one or more processors, cause the display device to perform operations comprising: receiving a reflection of sunlight from the cryptographic symbol; based on the reflection, decrypting the cryptographic symbol to determine a unique identifier; based on the identifier, generating a first virtual display; and rendering the first virtual display on an image of the surface, wherein the image is projected onto the surface.

* * * * *